United States Patent [19]
Abe et al.

[11] Patent Number: 5,139,817
[45] Date of Patent: Aug. 18, 1992

[54] METHOD FOR SURFACE TREATING AND COATING THERMOPLASTIC RESIN SHAPED ARTICLES

[75] Inventors: Hiroomi Abe; Hideo Shinonaga; Kaoru Kitadono; Yasuro Suzuki; Satoru Sogabe, all of Chiba, Japan

[73] Assignee: Sumitomo Chemical Co., Ltd., Osaka, Japan

[21] Appl. No.: 678,564

[22] Filed: Mar. 13, 1991

[30] Foreign Application Priority Data

Mar. 14, 1990 [JP] Japan .................................. 2-64724

[51] Int. Cl.$^5$ .............................................. B05D 3/06
[52] U.S. Cl. .................................... 427/54.1; 164/22; 427/322; 427/393.5
[58] Field of Search .................... 427/54.1, 322, 393.5; 264/22; 428/423.5, 423.7, 424.8; 522/96, 113, 114, 116, 161

[56] References Cited

U.S. PATENT DOCUMENTS

3,111,424 11/1963 LeClair ............................. 427/38 X
5,039,549 8/1991 Nguyen et al. ................. 427/322 X

*Primary Examiner*—Michael Lusignan
*Attorney, Agent, or Firm*—Sughrue, Mion, Zinn, Macpeak & Seas

[57] ABSTRACT

A method for surface treating a thermoplastic resin shaped article is disclosed, which comprises irradiating a surface of the shaped article with an ultraviolet light having a wavelength of 300 nm or less, said shaped article being obtained from a resin composition comprising (I) 100 parts by weight of a resin comprising from 5 to 100% by weight of a polyphenylene ether resin, a mixture of a polyphenylene ether resin and a styrene resin; or a graft copolymer of a polyphenylene ether resin and styrene and from 95 to 0% by weight of at least one thermoplastic resin selected from the group consisting of a polyamide resin and a saturated polyester resin; (II) from ) 0 to 50 parts by weight of a rubbery substance; (III) from 0 to 50 parts by weight of an inorganic filler and/or glass fibers; and (IV) from 0 to 10 parts by weight of at least one compatibilizer for improving the compatibility between said polyphenylene ether resin and said polyamide resin and/or saturated polyester resin. A method for coating said shaped article is also disclosed.

20 Claims, No Drawings

METHOD FOR SURFACE TREATING AND COATING THERMOPLASTIC RESIN SHAPED ARTICLES

FIELD OF THE INVENTION

The present invention relates to a method for surface treating a thermoplastic resin shaped article containing a polyphenylene ether resin and at least one thermoplastic resin selected from polyamide resins and saturated polyester resins, and also relates to a method for coating the above shaped article.

BACKGROUND OF THE INVENTION

A polyphenylene ether (PPE) resin is a thermoplastic resin having excellent properties such as mechanical properties, heat resistance, cold resistance, and dimensional stability. However, the polyphenylene ether resin alone shows very poor impact resistance and solvent resistance and also have poor processability because of high melt viscosity thereof. On the other hand, polyamide resins and saturated polyester resins are thermoplastic resins that are excellent in mechanical strength, solvent resistance, and processability, but they are insufficient in impact resistance and heat resistance and also have extremely poor dimensional stability due to high water absorption thereof. In order to take advantage of the desirable properties of the polyphenylene ether resin and the polyamide or saturated polyester resin and to cover the defects of these resins, it has been proposed to blend the both resins. However, since simple blending alone impairs the good mechanical properties possessed by the both resins, use of various compatibilizers at the time of blending the polyphenylene ether resin with the polyamide resin or saturated polyester resin is being practiced so as to improve dispersibility, thereby to attain improved mechanical properties. Such techniques are disclosed, for example, in JP-B-60-11966, JP-B-61-10494, JP-A-59-66452, and JP-A-56-49753. (The terms "JP-B" and "JP-A" as used herein mean an "examined Japanese patent publication" and an "unexamined published Japanese patent application", respectively.) The thus-obtained PPE/polyamide resin or saturated polyester resin compositions are coming to be used as materials having excellent mechanical properties, heat resistance, solvent resistance, processability, dimensional stability, and hygroscopicity, for applications in the fields of electrical-electronic appliances, automotive parts such as external automotive plates, parts located around engine, and wheel covers, etc.

Among such uses, external automotive plates in particular are an application in which coating is requisite.

In a conventional coating method, a shaped part obtained by shaping the above-described material is pretreated with isopropyl alcohol, etc., subsequently a medium called as a primer is applied on the pretreated surface, and then a coating is applied. Such a coating method has a problem that it necessitates a long coating line, causing the cost of a final product to be high. The high cost of a final product is also attributable to expensiveness of the primer itself. Hence, improvements are desired.

Other surface treatments for coating which have been proposed to date include sandblasting, treatment with a chromic acid mixture, flame treatment, corona discharge treatment, plasma treatment, and the like, but satisfactory results have not been obtained with any of these conventional treatments. Because of such circumstances, to develop a new treating method has come to be an important technical theme.

SUMMARY OF THE INVENTION

An object of the present invention is to provide a method for surface treating a shaped article of a composition comprising a polyphenylene ether resin and at least one thermoplastic resin selected from a polyamide resin and a saturated polyester resin to attain excellent coating suitability and to eliminate the above-described conventional problems.

Another object of the present invention is to provide a method for coating the above shaped article.

As a result of extensive investigations with the above objects, the inventors have now found that surface characteristics of the above-described thermoplastic resin shaped article having well-balanced physical properties and a uniform and smooth appearance can be markedly improved by irradiating a surface of the shaped article with an ultraviolet light whose main wavelength is present in a region of 300 nm or less. The present invention has been completed based on this finding.

That is, the present invention relates to a method for surface treating a thermoplastic resin shaped article, which comprises irradiating a surface of the shaped article with an ultraviolet light having an irradiation wavelength of 300 nm, the shaped article being obtained from a resin composition comprising (I) 100 parts by weight of a resin comprising from 5 to 100% by weight of a polyphenylene ether resin, a mixture of a polyphenylene ether resin and a styrene resin, or a graft copolymer of a polyphenylene ether resin and styrene and from 95 to 0% by weight of at least one thermoplastic resin selected from the group consisting of a polyamide resin and a saturated polyester resin; (II) from 0 to 50 parts by weight of a rubbery substance; (III) from 0 to 50 parts by weight of an inorganic filler and/or glass fibers; and (IV) from 0 to 10 parts by weight of at least one compatibilizer for improving the compatibility between the polyphenylene ether resin and the polyamide resin and/or saturated polyester resin.

The present invention also relates to a method for coating the above-described shaped article, which comprises surface treating the shaped article with an ultraviolet light as described above and then coating the irradiated surface with an alkyd-melamine-based or acrylic-urethane-based coating.

DETAILED DESCRIPTION OF THE INVENTION

The polyphenylene ether resin contained in resin (I) according to the present invention is a polymer obtained by oxidatively polymerizing at least one phenol compound represented by the following formula:

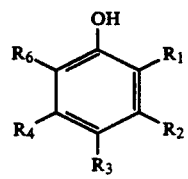

wherein $R_1$, $R_2$, $R_3$, $R_4$ and $R_5$ each represents a hydrogen atom, a halogen atom, a hydrocarbon group, or a substituted hydrocarbon group, provided that at least one of $R_1$, $R_2$, $R_3$, $R_4$, and $R_5$ is a hydrogen atom, in oxygen or an oxygen-containing gas in the presence of an oxidative coupling catalyst.

Specific examples of $R_1$, $R_2$, $R_3$, $R_4$, and $R_5$ in the above formula include hydrogen, chlorine, bromine, fluorine, iodine, and such groups as methyl, ethyl, n- or isopropyl, n-, iso-, sec-, or t-butyl, chloroethyl, hydroxyethy, phenylethyl, benzyl, hydroxymethyl, carboxyethyl, methoxycarbonylethyl, cyanoethyl, phenyl, chlorophenyl, methylphenyl, dimethylphenyl, ethylphenyl, and allyl.

Specific examples of the phenol compound represented by the above formula include phenol, o-, m-, or p-cresol, 2,6-, 2,5-, 2,4-, or 3,5-dimethylphenol, 2-methyl-6-phenylphenol, 2,6-diphenylphenol, 2,6-diethylphenol, 2-methyl-6-ethylphenol, 2,3,5-, 2,3,6-, or 2,4,6-trimethylphenol, 3-methyl-6-t-butylphenol, thymol, and 2-methyl-6-allylphenol. In addition, copolymers of the phenol compounds of the above formula with other phenol compounds, such as polyhydric aromatic compounds, e.g., bisphenol A, tetrabromobisphenol A, resorcin, hydroquinone, and a novolak resin, are also employable.

Preferred examples of the polyphenylene ether resin include a homopolymer of 2,6-dimethylphenol or 2,6-diphenyl-phenol and a copolymer of 2,6-dimethylphenol as a major component and 3-methyl-6-t-butylphenol or 2,3,6-trimethylphenol as a minor component.

More preferred of these is a 2,6-dimethylphenol homopolymer, i.e., poly(2,6-dimethyl-1,4-phenylene ether).

The oxidative coupling catalyst which can be used in the oxidative polymerization of the phenol compound is not particularly limited, and any catalyst capable of catalyzing this polymerization is usable. Typical examples of such a catalyst include those composed of a cuprous salt and a tertiary amine, e.g., cuprous chloride-triethylamine and cuprous chloride-pyridine; those composed of a cupric salt, an amine, and an alkali metal hydroxide, e.g., cupric chloride-pyridine-potassium hydroxide; those composed of a manganese salt and a primary amine, e.g., manganese chloride-ethanolamine and manganese acetate-ethylenediamine; those composed of manganese salt and an alcoholate or phenolate, e.g., manganese chloride-sodium methylate and manganese chloride-sodium phenolate; and those composed of a cobalt salt and a tertiary amine.

It is known that polyphenylene ether resin obtained by oxidative polymerization has physical properties varying depending on whether the oxidative polymerization is conducted at a temperature higher than 40° C. (high temperature polymerization) or at a temperature not higher than 40° C. (low temperature polymerization). In the present invention, either of high temperature polymerization or low temperature polymerization can be adopted.

The polyphenylene ether resin which can be contained in resin (I) according to the present invention also includes a polyphenylene ether resin to which a styrene polymer or other polymer is grafted. Methods for producing such grafted polyphenylene ether resins include a process in which a styrene monomer and/or other polymerizable monomer is graft polymerized in the presence of a polyphenylene ether resin and an organic peroxide, as described, for example, in JP-B-47-47862, JP-B-48-12197, JP-B-49-5623, JP-B-52-38596, and JP-B-52-30991; and a process in which the above-described polyphenylene ether resin, a styrene polymer, and a free radical generator are melt kneaded as described in JP-A-52-142799.

The styrene resin which may be contained in resin (I) is generally selected from polymers containing at least 25% by weight of units derived from vinylaromatic monomers such as those represented by the following formula:

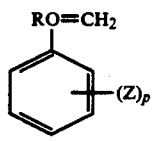

wherein R represents hydrogen, a lower alkyl group, e.g., alkyl groups having from 1 to 4 carbon atoms, or a halogen; Z represents hydrogen, a vinyl group, a halogen atom, or a lower alkyl group; and p is 0 or an integer of from 1 to 5. Examples of the styrene resin include homopolymers such as polystyrene, polychlorostyrene, poly(α-methylstyrene), and poly(p-methyl-styrene); and styrene-containing copolymers such as styrene-acrylonitrile copolymers, copolymers of ethylvinylbenzene and divinylbenzene, and styrene-acrylonitrile-methylstyrene terpolymers.

Of these, a styrene homopolymer is particularly preferred.

The styrene resin in the present invention further includes rubber-modified polystyrene resins.

The rubber-modified polystyrene resin as referred to in this invention means any of various polystyrene compositions containing a two-phase system consisting of a matrix of the above-described styrene resin and a rubber dispersed therein in the form of separate particles. Such rubber particles can be formed by mechanically blending the polystyrene resin and rubber. Alternatively, the rubber-modified polystyrene may be produced by polymerizing styrene in the presence of a rubber, thereby dispersing the grafted elastomer phase in the resulting polystyrene resin. In this case, the elastomer phase particles contain a styrene polymer sorbed thereby.

Resin (I) according to the present invention may be a mixture of a polyphenylene ether resin and a styrene resin, and in this case, the proportion of the two polymers may be selected freely. In general, the content of the styrene resin in resin (I) and that of the polyphenylene ether resin each preferably is from 20 to 80% by weight based on the total amount of the polyphenylene ether resin and the styrene resin excluding rubber.

The polyamide resin which may be contained in resin (I) according to the present invention is one or more polyamides selected from aliphatic polyamides, thermoplastic aromatic copolyamides, and aromatic nucleus-hydrogenated copolyamides. Specific examples of such polyamides are as follows. The aliphatic polyamides are those which have a molecular weight of about 10,000 or more and may be prepared by linking a saturated aliphatic dicarboxylic acid having from 4 to 12 carbon atoms with an equimolar amount of an aliphatic diamine having from 2 to 12 carbon atoms. In this case, it is possible, if desired, to use the diamine such that terminal amine groups are present in excess relative to terminal carboxyl groups. Conversely, a dibasic acid may be used such that acid groups are present in excess. Likewise, these polyamides may also be satisfactorily produced from the above-described acid and an amine-forming derivative, such as, for example, esters, acid chlorides, and amine salts. Representative examples of the aliphatic dicarboxylic acid used to produce the aliphatic polyamide include adipic acid, pimelic acid, azelaic acid, suberic acid, sebacic acid, and dodecanedioic acid. On the other hand, representative examples of the aliphatic diamine include hexamethylenediamine and octamethylenediamine. These aliphatic polyamides may also be produced by self-condensation of lactams. Examples of the aliphatic polyamides include polyhexamethylene adipamide (nylon 6.6), polyhexamethylene azelamide (nylon 6.9), polyhexamethylene sebacamide (nylon 6.10), polyhexamethylene dodecanamide (nylon 6.12), poly-bis(p-aminocyclohexyl)methanedodecanamide, and polytetramethylene adipamide (nylon 4.6). Examples thereof further include polyamides formed by the ring cleavage of lactams, such as polycaprolactam (nylon 6) and polylauryllactam. Further, polyamides produced by polymerization in which at least two amines or acids selected from those used for producing the above-mentioned polymers are employed, such as, for example, polymers produced from adipic acid, sebacic acid, and hexamethylenediamine. Examples of the aliphatic polyamides furthermore include polyamide blends such as blends of nylon 6.6 and nylon 6 and copolymers such as nylon 6.6/6. Preferred aliphatic polyamides for use in resin (I) include polyhexamethylene adipamide (nylon 6.6), polycaprolactam (nylon 6), and blends of polyhexamethylene adipamide (nylon 6.6) and polycaprolactam (nylon 6).

The thermoplastic aromatic copolyamides are copolyamides containing an aromatic component, such as, for example, polyhexamethylene isophthalamide (nylon 6I). Such thermoplastic copolyamides containing an aromatic component mean melt polymerizable polyamides which contain, as major constituent components, aromatic amino acids and/or aromatic dicarboxylic acids, such as p-aminomethylbenzoic acid, p-aminoethylbenzoic acid, terephthalic acid, and isophthalic acid.

Examples of diamines that can be used as other constituent components in the aromatic polyamides include hexamethylenediamine, undecamethylenediamine, dodecamethylenediamine, 2,2,4- or 2,4,4-trimethylhexamethylenediamine, m-xylylenediamine, p-xylylenediamine, bis(p-aminocyclohexyl)-methane, bis(p-aminocyclohexyl)propane, bis(3-methyl-4-aminocyclohexyl)methane, 1,3-bis(aminomethyl)cyclohexane, and 1,4-bis(aminomethyl)cyclohexane. In place of these diamines, isocyanates may be used. If required, other comonomers may be used without any particular limitation, such as, for example, 4,4,-diphenylmethane diisocyanate and tolylene diisocyanate. Further, lactams, ω-amino acids having from 4 to 12 carbon atoms, and compounds derived from an aliphatic dicarboxylic acid having from 4 to 12 carbon atoms and an aliphatic diamine having from 2 to 12 carbon atoms may also be utilized. Examples thereof include such lactams and amino acids as ε-caprolactam, ω-laurolactam, 11-aminoundecanoic acid, and 12-aminododecanoic acid, and equimolar salts of various diamines enumerated above with adipic acid, azelaic acid, or sebacic acid.

Representative examples of the thermoplastic aromatic copolyamides comprising the above-mentioned components include a copolyamide of p-aminomethylbenzoic acid and ε-caprolactam (e.g., nylon AHBA/6); polyamides comprising, as a major component, a 2,2,4- or 2,4,4-trimethylhexamethylenediamine terephthalic acid salt (e.g., nylon THDT, nylon THDT/6I); polyamides comprising, as a major component or components, a hexamethylenediamine isophthalic acid salt and/or a hexamethylenediamine terephthalic acid salt and, as a comonomer component or components, a bis(p-aminocyclohexyl)methane isophthalic and/or terephthalic acid salt, a bis(3-methyl-4-aminocyclohexyl)methane isophthalic and/or terephthalic acid salt, or a bis(p-aminocyclohexyl)propane isophthalic and/or terephthalic acid salt (e.g., nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T); polyamides comprising, as a major component, a hexamethylenediamine isophthalic acid salt or a hexamethylenediamine terephthalic acid salt and, as a comonomer component, ε-caprolactam, 12-aminododecanoic acid, a hexamethylenediamine adipic acid salt, a bis(p-aminocyclohexyl)methane adipic acid salt, a bis{3-methyl-4-aminocyclohexyl)methane adipic acid salt, or the like (e.g., nylon 6I, nylon 6I/6T, nylon 6I/12, nylon 6T/6, nylon 6T/6.6, nylon 6I/PACM 6, nylon 6I/DMPACM 6); and polyamides comprising, as a major component, a bis(p-aminocyclohexyl)methane isophthalic acid salt or a bis(3-methyl-4-aminocyclohexyl)methane isophthalic acid salt and, as a comonomer component, a hexamethylenediamine dodecanedioic acid salt, 12-aminododecanoic acid, or the like (e.g., nylon PACM I/612, nylon DMPACM I/12).

The aromatic nucleus-hydrogenated copolyamides mean alicyclic copolyamides obtained from the same ingredients for the above-described aromatic copolyamides except that the terephthalic acid or isophthalic acid used as the acid monomer is replaced with cyclohexane-1,4-dicarboxylic acid or cyclohexane-1,3-dicarboxylic acid obtained by nucleus hydrogenation of terephthalic acid and isophthalic acid. Further, nucleus-hydrogenated products obtained by nucleus hydrogenation of diamines and diisocyanates (e.g., 4,4,-diphenylmethane diisocyanate, tolylene diisocyanate) may also be used as the monomer.

Preferred polyamides for use in resin (I) according to the present invention are those having a relative viscosity less than 2.5 (as measured at 25° C. on a solution of 1 g polyamide in 100 cc of 98% concentrated sulfuric acid as a solvent). The reason for this is that if a polyamide having too high a viscosity (relative viscosity of 2.5 or more) is used to prepare a polyphenylene ether/polyamide composition, and an inorganic filler is incorporated thereinto, the resulting composition comes to have a high melt viscosity to show poor fluidity at the time of shaping.

The saturated polyester resin which may be contained in resin (I) according to the present invention comprises a dicarboxylic acid monomer component, at least 40 mol% of which is a terephthalic acid monomer, and a diol component. Other dicarboxylic acid components than terephthalic acid include aliphatic dicarboxylic acids having from 2 to 20 carbon atoms such as adipic acid, sebacic acid, and dodecanedicarboxylic acid; aromatic dicarboxylic acids such as isophthalic acid and naphthalenedicarboxylic acid; and alicyclic dicarboxylic acids such as cyclohexanedicarboxylic acid. These dicarboxylic acids may be used alone or as a mixture thereof. Examples of the diol component include aliphatic or alicyclic glycols such as ethylene glycol, 1,3-propanediol, 1,4-butanediol, 1,6-hexanediol, 1,10-decanediol, and 1,4-cyclohexanediol. These glycols may be used alone or as a mixture thereof.

Of these saturated polyester resins, polybutylene terephthalate and polyethylene terephthalate are particularly effective for producing the effects of the present invention. The saturated polyester resin preferably has an intrinsic viscosity ranging from 0.5 to 3.0 dl/g as measured at 25° C. using o-chlorophenol as a solvent. With a saturated polyester resin whose intrinsic viscosity is out of this range, the desired mechanical strength can hardly be obtained.

Rubbery substance (II) which may be contained in the resin composition to be used for producing the shaped article treated in the present invention can be an elastomer and/or a polyolefin resin or the like having a low flexural modulus and/or a modified rubbery substance.

Specific examples include ethylene-propylene rubbers, ethylene-propylene-non-conjugated diene rubbers, ethylene-butene rubbers, propylene-butene rubbers, isoprene-butylene rubbers, polyisoprene, polybutadiene, styrene-butadiene rubbers, styrene-butadiene-styrene block copolymers, partially hydrogenated styrene-butadiene block copolymers, styrene-isoprene block copolymers, styrene-grafted ethylene-propylene rubbers, styrene-grafted ethylene-propylene-non-conjugated diene rubbers, styrene-acrylonitrilegrafted ethylene-propylene rubbers, styrene-acrylonitrile-grafted ethylene-propylene-non-conjugated diene rubbers, partially hydrogenated styrene-isoprene block copolymers, Thiokol rubbers, polysulfide rubbers, polyurethane rubbers, polyether rubbers (e.g., polypropylene oxide), epichlorohydrin rubbers, polyester elastomers, polyamide elastomers, linear low-density polyethylene, and mixtures thereof.

The modified rubbery substance may be obtained by modifying any of the above-mentioned rubbery substances with a compatibilizer. Examples of modified rubbery substances that can be used as rubbery substance (II) include maleic anhydride-grafted ethylene-propylene rubbers, maleic anhydride-grafted styrene-butadiene-styrene block copolymers, maleic anhydride-grafted partially hydrogenated styrene-butadiene block copolymers, maleic anhydride-grafted partially hydrogenated styrene-isoprene block copolymers, and glycidyl methacrylate-grafted ethylene-propylene rubbers.

Examples of modified rubbery substances that can be used as rubbery substance (II) further include those in which compatibilizers have been copolymerized, such as ethylene-acrylate-maleic anhydride copolymers, ethylene-acrylate-glycidyl methacrylate copolymers, ethylene-vinyl acetate-glycidyl methacrylate copolymers, and blends thereof.

Particularly preferred rubbery substances are ethylene-propylene rubbers, ethylene-propylene-non-conjugated diene rubbers, styrene-butadiene block copolymers, partially hydrogenated styrene-butadiene block copolymers, styrene-isoprene block copolymers, partially hydrogenated styrene-isoprene block copolymers, styrene-grafted ethylene-propylene rubbers, styrene-acrylonitrile-grafted ethylene-propylene rubbers, styrene-grafted ethylene-propylene-non-conjugated diene rubbers, styrene-acrylonitrile-grafted ethylene-propylene-non-conjugate diene rubbers, carboxyl or glycidyl group-modified products of these rubbers or copolymers, linear low-density polyethylene having a density in the range of from 0.885 to 0.935 g/cm:, preferably from 0.885 to 0.925 g/cm³, ethylene-methyl acrylate-maleic anhydride copolymers, ethylene-ethyl acrylate-maleic anhydride copolymers, ethylene-vinyl acetate-glycidyl methacrylate copolymers, ethylene-methyl acrylate-glycidyl methacrylate copolymers, and mixtures thereof.

Examples of compatibilizer (IV) which can be contained in the resin composition to be used for producing the shaped article treated in the present invention include:

(A) compounds containing, in the molecule thereof, both of (a) a carbon-carbon double bond or a carbon-carbon triple bond and (b) a carboxyl group, an acid anhydride group, an amino group, an acid amide group, an imido group, an epoxy group, a carboxylic acid ester group, an isocyanate group, a methylol group, or a hydroxyl group;

(B) aliphatic polycarboxylic acids or derivatives thereof represented by the following formula:

$$(R^{I}O)_{m}R(COOR^{II})_{n}(CONR^{III}R^{IV})_{s}$$

wherein R represents a straight-chain or branched, saturated aliphatic hydrocarbon group having from 2 to 20 carbon atoms; $R^1$ is selected from the group consisting of a hydrogen atom, an alkyl group having from 1 to 10 carbon atoms, an aryl group, an acyl group, and a carbonyldioxy group; $R^{II}$ each independently is selected from the group consisting of a hydrogen atom, an alkyl group having from 1 to 20 carbon atoms, and an aryl group; $R^{III}$ and $R^{IV}$ each independently is selected from the group consisting of a hydrogen atom, an alkyl group having from 1 to 10 carbon atoms, and an aryl group; m is 1; n and s each independently is 0 or more, provided that (n+s) is 2 or more; and the group of $(OR^{I})$ is at the α- or β-position with respect to the carbonyl group and at least two carbonyl groups are separated from each other by 2 to 6 carbon atoms, and reaction products of said acids or derivatives;

(C) functional polyphenylene ethers comprising a reaction product of (a) polyphenylene ether with (b) a compound represented by the following formula:

$$(i)-Z-(ii)$$

wherein (i) represents a group of the formula, [X—C(O)], wherein X is F, Cl, Br, I, OH, —OR, or —O—C(O)—R, and R is H, an alkyl group, or an aryl group; (ii) represents a carboxylic acid group, an acid anhydride group, an acid amide group, an imido group, a carboxylic acid ester group, an amino group, or a hydroxyl group, the groups of (i) and (ii) being covalently bonded with each other the crosslinkage Z, and Z represents a divalent hydrocarbon group;

(D) silane compounds containing, in the molecular structure thereof, both of (a) at least one silicon atom bonded to a carbon atom through crosslinkage of oxygen and (b) an ethylenic carbon-carbon double bond or a carbon-carbon triple bond and/or a functional group selected from an amino group and a mercapto group, said functional group being not directly bonded to the silicon atom;

(E) oxidized polyolefin waxes;

(F) copolymers containing a vinyl aromatic compound unit and an α,β-unsaturated dicarboxylic acid or dicarboxylic anhydride unit, or copolymers containing a vinyl aromatic compound unit and a unit derived from an imide compound of an α,β-unsaturated dicarboxylic acid; and (G) reaction products obtained by reacting (a) a 1,2-substituted olefin compound having a carboxyl group or an acid anhydride group with (b) polyphenylene ether in the presence or absence of (c) a free-radical initiator.

Examples of compounds (A) which can be used as compatibilizer (IV) include maleic anhydride, maleic acid, fumaric acid, maleimide, maleic hydrazide, reaction products of maleic anhydride with diamines, such as those represented by the following structural formulae:

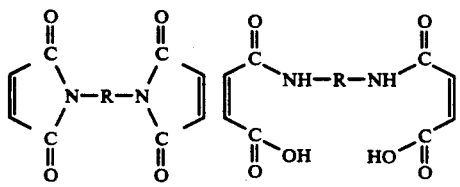

wherein R represents an aliphatic or aromatic group, methylnadic anhydride, dichloromaleic anhydride, maleic acid amide; natural fats and oils such as soybean oil, tung oil, castor oil, linseed oil, hempseed oil, cottonseed oil, sesame oil, rapeseed oil, peanut oil, camellia oil, olive oil, coconut oil, and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethyl-crotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid, and traacontinic acid; esters, acid amides, and anhydrides of these unsaturated carboxylic acids; unsaturated alcohols such as allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols represented by formulae, $C_nH_{2n-5}OH$, $C_nH_{2n-7}OH$, and $C_nH_{2n-9}OH$, wherein n is a positive integer), 3-butene-1,2-diol, 2,5-dimethyl-3-hexene-2,5-diol, 1,5-hexadiene-3,4-diol, and 2,6-octadiene-4,5-diol; unsaturated amines obtained by replacing part or all of the OH groups in the above-described unsaturated alcohols with $NH_2$ groups; and esters and ethers such as glycidyl acrylate, glycidyl methacrylate, and allyl glycidyl ether.

It is a matter of course that compounds (A) that can be used as compatibilizer (IV) include compounds containing two or more of the (identical or different) functional groups enumerated in the group (a) and compounds containing two or more (identical or different) of the (identical or different) functional groups enumerated in the group (b). It is also possible to use two or more of such compounds (A) in combination. Particularly preferred of compounds (A) are maleic anhydride, maleic acid, fumaric acid, itaconic acid, himic anhydride, glycidyl acrylate, glycidyl methacrylate, and allyl glycidyl ether.

Examples of compounds (B) which can be used as compatibilizer (IV) include citric acid, malic acid, and calcium or potassium salts of these acids.

Examples of compounds (C) which can be used as compatibilizer (IV) include those obtained by reacting polyphenylene ether with, for example, chloroetianoyl-succinic anhydride, trimellitic anhydride chloride, chloroformylsuccinic anhydride, 1-acetoxyacetyl-3,4-dibenzoic anhydride, or terephthalic acid chloride. The reaction products thus formed can be purified by precipitation from methanol or acetone. These compatibilizers may be used in combination with a primary or secondary amine such as, for example, butylamine, dibutylamine, or n-octadecylamine.

Examples of compounds (D) which can be used as compatibilizer (IV) include γ-aminopropyltriethoxysilane, vinyl-tris(2-methoxyethoxy)silane, 5-(bicycloheptenyl)triethoxysilane, and γ-mercaptopropyltrimethoxysilane.

Oxidized polyolefin waxes (E) which can be used as compatibilizer (IV) may usually be prepared by oxidizing polyolefin waxes in air or a suspension.

Examples of compounds (F) which can be used as compatibilizer (IV) include styrene-maleic anhydride copolymers, styrene-maleic anhydride-methacrylate terpolymers, styrene-maleic anhydride-acrylate terpolymers, and rubber-modified of these polymers.

Examples of compounds (G) which can be used as compatibilizer (IV) include products obtained by reacting (a) 1,2-substituted olefins such as maleic anhydride, maleic acid, and fumaric acid with (b) polyphenylene ether in the presence or absence of (c) a peroxide such as benzoyl peroxide by means of melt kneading method, etc.

Of these compounds (A) to (G) for use as compatibilizer (IV), compounds (A) are preferred. Particularly preferred of compounds (A) are maleic anhydride, maleic acid, fumaric acid, itaconic acid, himic anhydride, glycidyl acrylate, glycidyl methacrylate, and allyl glycidyl ether.

Examples of inorganic filler (III) which can be contained in the resin composition to be used for producing the shaped article treated in the present invention include talc (magnesium silicate), clay (aluminum silicate), zinc oxide, titanium oxide, and calcium carbonate, with talc being preferred. The inorganic filler preferably has an average particle diameter of 5.0 μm or less, and more preferably has such an average particle diameter of 5.0 μm or less and an aspect ratio of 5 or more. While the inorganic filler may be used in an untreated state, it can be used after being surface treated with any of various silane coupling agents, titanium coupling agents, higher fatty acids, higher fatty acid esters, higher fatty acid amides, higher fatty acid salts, or other surface active agents for the purpose of improving interfacial adhesion to the polyphenylene ether resin and nylon resin and/or saturated polyester resin or for the purpose of improving dispersibility.

Glass fibers can be used either alone or in combination with the inorganic filler. In order to improve interfacial adhesion to the polyphenylene ether resin and/or the polyamide resin and/or saturated polyester resin and to improve dispersibility, glass fibers can be used in combination with any of various coupling agents generally including silane coupling agents and titanium coupling agents.

The proportion of each component of the resin composition to be used for producing the shaped article treated in the present invention is as follows.

In resin (I), the blend ratio of a polyphenylene ether resin, a mixture of a polyphenylene ether resin and a styrene resin, or a graft copolymer of a polyphenylene ether resin and styrene to at least one thermoplastic resin selected from the group consisting of a polyamide resin and a saturated polyester resin is from 5:95 to 100:0 by weight, preferably from 5:95 to 95:5 by weight. If the blend ratio is outside the range, the desired effects of the present invention cannot be obtained. More preferably, the blend ratio is from 30:70 to 70:30 by weight.

The amount of rubbery substance (II) incorporated in the resin composition is from 0 to 50 parts by weight per 100 parts by weight of resin (I) comprising a polyphenylene ether-based resin and at least one thermoplastic resin selected from a polyamide resin and a saturated polyester resin. In the case where the resin composition contains no rubbery substance, the composition has improved heat resistance, rigidity, and dimensional stability, although its impact resistance is not so good. Rubbery substance amounts exceeding 50 parts by weight are not preferred because the resulting compositions have significantly impaired heat resistance. The more preferred range of the amount of rubbery substance (II) incorporated is from 0 to 30 parts by weight.

The amount of compatibilizer (IV) incorporated in the resin composition is from 0 to 10 parts by weight per 100 parts by weight of resin (I). If the amount of compatibilizer (IV) exceeds 10 parts by weight, the appearance is poor.

The amount of inorganic filler and/or glass fibers (III) incorporated in the resin composition is from 0 to 50 parts by weight per 100 parts by weight of resin (I). In the case where the resin composition contains neither inorganic filler nor glass fibers, the composition has improved impact resistance, although its heat resistance, rigidity, and dimensional stability are not so good. If component (III), an inorganic filler and/or glass fibers, are incorporated in an amount exceeding 50 parts by weight, the resulting composition unpreferably has significantly impaired impact resistance. The preferred range of the amount of component (III) is from 0 to 30 parts by weight. In the case where an inorganic filler and glass fibers are used in combination, the ratio of the amount of the former to that of the latter may be in the range of from 20:80 to 80:20 by weight.

If desired, the thermoplastic resin composition to be used for producing the shaped article treated in the present invention may further contain pigments, ultraviolet absorbents, heat stabilizers, flame retardants, antioxidants, plasticizers, and the like.

Methods for blending component (I-1) which is a polyphenylene ether resin, a mixture of a polyphenylene ether resin and a styrene resin, or a graft copolymer of a polyphenylene ether resin and styrene, component (I-2) which is at least one thermoplastic resin selected from the group consisting of polyamide resins and saturated polyester resins, rubbery substance (II), inorganic filler (III-1), glass fibers (III-2), and compatibilizer (IV) to prepare the resin composition to be used for producing the shaped article treated in the present invention are not particularly limited, and known melt kneading techniques may be used. Employable melt kneading devices include an extruder, a kneader, rolls, and the like, with an extruder being particularly preferred. The order of incorporating each component during melt kneading is not particularly limited. That is, any of the following methods may be used: a method in which components (I-1), (I-2), (II), (III-1) and/or (III-2), and (IV) are introduced into the melt kneading device at a time and melt kneaded simultaneously; a method in which components (I-1) and (IV) are melt kneaded beforehand in the presence or absence of a free radical initiator, and components (I-2), (II), and (III-1) and/or (III-2) are then added thereto and melt kneaded together; a method in which components (I-1), (II), and (IV) are melt kneaded beforehand in the presence or absence of a free radical initiator, and components (I-2) and (III-1) and/or (III-2) are then added thereto and melt kneaded together; a method in which components (I-1), (II), (IV), and (III-1) and/or (III-2) are melt kneaded beforehand in the presence or absence of a free radical initiator, and component (I-2) is then added thereto and melt kneaded together; a method in which components (I-1), (II), and (IV) are melt kneaded beforehand, subsequently component (I-2) is added thereto and kneaded together, and then components (III-1) and/or (III-2) is added thereto and melt kneaded together; and other similar methods.

The kneaded resin composition may be shaped by various shaping techniques including injection molding and extrusion.

The surface treating method and coating method of the present invention are explained below.

In the present invention, a surface of the thermoplastic resin shaped article is irradiated with an ultraviolet light.

This shaped article may have any of various forms such as films, plates, fibers, etc.

The light with which the surface is irradiated is a light having a wavelength of 300 nm or less, and particularly is an ultraviolet light containing rays having wavelengths of 254 nm and 185 nm as main working wavelengths. Higher intensities are preferred.

Although there is no need, in this invention, of degreasing the surface of the thermoplastic resin shaped article with a solvent, etc. before irradiation with an ultraviolet light, degreasing may be conducted in an ordinarily known manner.

Suitable degreasing agents which can be used to degrease the surface of the shaped article include water, aqueous solutions of alkalis, etc., alcohols, e.g., ethanol and isopropyl alcohol, and the like.

Methods for bringing the degreasing agent into contact with the surface of the shaped article include coating or wiping, spraying, and the like. Degreasing may also be accomplished by power washing with an aqueous solution of an acid, an alkali, etc.

The irradiation with an ultraviolet light to be conducted in the present invention is preferably conducted for a period of from 20 seconds to 10 minutes, more preferably from 30 seconds to 5 minutes. If the irradiation time is shorter than 20 seconds, sufficient improvements in the coating suitability, adhesion properties, and printability of the resin shaped article may not be obtained. An irradiation time longer than 10 minutes may be not only uneconomical but cause deterioration of the resin surface, producing an adverse effect.

According to the present invention, the thus irradiated shaped article may be coated with an alkyd-melamine coating or an acrylic-urethane coating.

The present invention is now illustrated in greater detail with reference to the following Examples and Comparative Examples, but it should be understood that the present invention is not deemed to be limited thereto. In the Examples and Comparative Examples, all parts are by weight.

I. RAW MATERIALS USED IN EXAMPLES AND COMPARATIVE EXAMPLES

The following polyphenylene ether, saturated polyester resin, high-impact polystyrene, and modified rubbery substance were used in addition to a commercially available unmodified rubbery substance and polyamide.

(1) Polyphenylene ether (hereinafter referred to as "PPE"):

The PPE used is one obtained by dissolving 2,6-dimethylphenol in a mixture of toluene and methanol, adding manganese chloride-ethylenediamine thereto, and then conducting oxidative polymerization in an oxygen atmosphere at a temperature of 30° C.

(2) Saturated polyester resin:

Polybutylene terephthalate; Tufpet PBT® N1200, manufactured by Mitsubishi Rayon Co., Ltd.

(3) High-impact polystyrene:

High-impact polystyrene having a butadiene rubber content of 8.6 wt% was used.

(4) Modified rubbery substance:

A maleic anhydride-grafted ethylene-propylene rubber (MAH-EPR) obtained as follows was used.

An ethylene-propylene rubber ("Sumitomo Esprene® E120P", manufactured by Sumitomo Chemical Company, Limited) was mixed beforehand with maleic anhydride and t-butyl peroxylaurate. This mixture was fed to an extruder having a screw diameter of 30 mm and an L/D ratio of 28 and having a barrel temperature of 230° C., and reaction of the rubber with maleic anhydride was conducted in the extruder at a screw revolution number of 60 rpm. Strands of the modified rubber discharged form a die were cooled with water and then pelletized.

The grafted amount of maleic anhydride was 1.5 wt% based on the amount of the rubber.

II. EVALUATION OF COATING SUITABILITY

Coating suitability of shaped articles were evaluated in terms of the initial adhesion strength of a coating as follows.

The surface of the shaped article sample was coated with a coating, and the coating layer was crosshatched with a razor blade so as to make 100 (10×10) 2-mm squares. A 24 mm-wide adhesive tape ("Cello Tape®" produced by Nichiban Company, Limited) was applied to the crosshatched coating layer surface by pressing it with a finger, and then the tape was stripped at a stretch by forcibly pulling one end of the tape. The number of squares remaining after the tape stripping was counted to obtain a retention (%), which indicated the initial adhesion strength of the coating.

EXAMPLE 1

50 Parts of PPE, 10 parts of maleic anhydride-grafted ethylene-propylene rubber (MAH-EPR) as a rubbery substance, and 0.4 part of maleic anhydride were fed to a continuous twin-screw extruder ("TEM-50", manufactured by Toshiba Machine Co., Ltd.) from a first hopper, while 50 parts of a polyamide ("Unitika Nylon® A1030BRL", produced by Unitika Ltd.) was fed to the extruder by means of a constant-delivery feeder from a second hopper provided between the first hopper and a vent hole. These ingredients were melt kneaded at a cylinder temperature of 260° C. and a screw revolution number of 380 rpm, and then granulated. Using the thus-obtained granules, a molded article in a plate form was prepared by means of an injection molding machine ("IS-150E", manufactured by Toshiba Machine Co., Ltd.).

The molded article was placed in front of an ultraviolet light-irradiating apparatus equipped with a low-mercury vapor pressure lamp (made of synthetic quartz, 200 W), with the distance between the light source and the molded article surface being about 15 cm. Surface treatment was then conducted by irradiating the surface with an ultraviolet light having main acting wavelengths of 254 nm and 185 nm in an air atmosphere for 120 seconds.

The irradiated surface was then coated with an alkyd-melamine coating ("Luga Bake®", manufactured by Kansai Paint Co., Ltd.). This was done by applying the coating twice, followed by baking at 140° C. for 40 minutes. The initial adhesion strength of the coating was measured, and the results obtained are shown in Table 1 given later.

EXAMPLE 2

The same procedures as in Example 1 were repeated except that the surface of the molded article was degreased with isopropyl alcohol and that ultraviolet light-irradiating time was changed to 60 seconds. The initial adhesion strength of the coating is shown in Table 1.

COMPARATIVE EXAMPLE 1

The same procedures as in Example 1 were repeated except that the ultraviolet light irradiation was omitted. The initial adhesion strength of the coating is shown in Table 1.

COMPARATIVE EXAMPLE 2

The same procedures as in Example 2 were repeated except that the ultraviolet light irradiation was omitted. The initial adhesion strength of the coating is shown in Table 1.

EXAMPLE 3

The same procedures as in Example 2 were repeated except that a styrene-butadiene-styrene block copolymer rubber (SBS; "Clayton® TR 1102", manufactured by Shell Chemical Co., Ltd.) was used as a rubbery substance. The initial adhesion strength of the coating is shown in Table 1.

COMPARATIVE EXAMPLE 3

The same procedures as in Example 3 were repeated except that the ultraviolet light irradiation was omitted. The initial adhesion strength of the coating is shown in Table 1.

EXAMPLE 4

The same procedures as in Example 2 were repeated except that 15 parts of magnesium silicate (talc; "MW5000S", manufactured by Hayashi Kasei Co. Ltd.) was fed from the first hopper as an inorganic filler. The initial adhesion strength of the coating is shown in Table 1.

COMPARATIVE EXAMPLE 4

The same procedures as in Example 4 were repeated except that the ultraviolet light irradiation was omitted. The initial adhesion strength of the coating is shown in Table 1.

EXAMPLE 5

The same procedures as in Example 1 were repeated except that the coating used in Example 1 was replaced with an acrylic-urethane coating ("Origiplate ZNY", manufactured by Origin Electric Co., Ltd.) and that baking was conducted at 80° C. for 30 minutes. The initial adhesion strength of the coating is shown in Table 2.

COMPARATIVE EXAMPLE 5

The same procedures as in Example 5 were repeated except that the ultraviolet light irradiation was omitted. The initial adhesion strength of the coating is shown in Table 2.

diisocyanate. This mixture was melt kneaded in a 40-mm$\phi$ single-screw extruder (manufactured by Tanabe Plastics Co., Ltd.) at a cylinder temperature of 280° C. and a screw revolution number of 90 rpm, and then granulated. The thus-obtained pellets were molded into a plate form by means of an injection molding machine ("IS-150E", manufactured by Toshiba Machine Co., Ltd.).

The molded article was placed in front of an ultraviolet light-irradiating apparatus equipped with a low-mercury vapor pressure lamp (made of synthetic quartz, 200 W), with the distance between the light source and the molded article surface being about 10 cm. Surface treatment was then conducted by irradiating the surface with an ultraviolet light having main acting wavelengths of 254 nm and 185 nm in an air atmosphere for 60 seconds.

The irradiated surface was then spray coated with acrylic-urethane coating R271 (manufactured by Nippon Bee Chemical Co., Ltd.), and the coating applied was baked and dried at 90° C. for 30 minutes. The initial adhesion strength of the coating was measured. As a result, the retention was 100%, showing good initial adhesion.

TABLE 1

| | Composition (parts) | | | | | Initial Adhesion Strength of Coating (%) |
|---|---|---|---|---|---|---|
| | PPE | Polyamide Resin | Compatibilizer | Rubbery Substance | Filler | Pre-treatment |
| Example 1 | 50 | 50 | 0.4 | MAH-EPR 10 | — | none | 100 |
| Example 2 | 50 | 50 | 0.4 | MAH-EPR 10 | — | IPA wiping | 100 |
| Example 3 | 50 | 50 | 0.4 | SBS 10 | — | IPA wiping | 100 |
| Example 4 | 50 | 50 | 0.4 | MAH-EPR 10 | talc 15 | IPA wiping | 100 |
| Comparative Example 1 | 50 | 50 | 0.4 | MAH-EPR 10 | — | none | 0 |
| Comparative Example 2 | 50 | 50 | 0.4 | MAH-EPR 10 | — | IPA wiping | 0 |
| Comparative Example 3 | 50 | 50 | 0.4 | SBS 10 | — | IPA wiping | 0 |
| Comparative Example 4 | 50 | 50 | 0.4 | MAH-EPR 10 | talc 15 | IPA wiping | 0 |

TABLE 2

| | Composition (parts) | | | | | Initial Adhesion Strength of Coating (%) |
|---|---|---|---|---|---|---|
| | PPE | Polyamide Resin | Compatibilizer | Rubbery Substance | Pre-treatment | |
| Example 5 | 50 | 50 | 0.4 | MAH-EPR 10 | none | 100 |
| Comparative Example 5 | 50 | 50 | 0.4 | MAH-EPR 10 | none | 85 |

EXAMPLE 6

45 parts of PPE, 55 parts of polybutylene terephthalate, 1.6 parts of maleic anhydride, 2 parts of styrene, and 1 part of 1,3-bis(t-butylperoxyisopropyl)benzene ("Sanperox® TY1.3, manufactured by Sanken Chemical Industrial Co., Ltd.) as a free radical initiator were melt kneaded in a continuous twin-screw extruder ("TEM-50", manufactured by Toshiba Machine Co., Ltd.) at a cylinder temperature of 280° C. and a screw revolution number of 300 rpm, and the resulting blend was granulated. Thus, a resin composition was prepared.

To 100 parts of the thus-obtained resin composition was added 5 parts of phenol-blocked diphenylmethane

COMPARATIVE EXAMPLE 6

The same procedures as in Example 6 were repeated except that the ultraviolet light irradiation was omitted. The initial adhesion strength of the coating was measured and, as a result, the retention was 80%.

EXAMPLE 7

50 parts of PPE and 50 parts of high-impact polystyrene were melt kneaded in a continuous twin-screw extruder ("TEM-50", manufactured by Toshiba Machine Co., Ltd.) at a cylinder temperature of 260° C. and a screw revolution number of 200 rpm, and the resulting blend was granulated. The thus-obtained granules were molded into a plate form by means of an injection molding machine ("IS-220E", manufactured by Toshiba Machine Co., Ltd.).

The molded article was placed in front of an ultraviolet-irradiating apparatus equipped with a low-mercury vapor pressure lamp (made of synthetic quartz, 200 W), with the distance between the light source and the molded article surface being about 10 cm. Surface treatment was then conducted by irradiating the surface with an ultraviolet light having main acting wavelengths of 254 nm and 185 nm in an air atmosphere for 60 seconds.

The irradiated surface was then spray coated with acrylic-urethane coating R271 (manufactured by Nippon Bee Chemical Co., Ltd.), and the coating applied was baked and dried at 90° C. for 30 minutes. The initial adhesion strength of the coating was measured. As a result, the retention was 98%.

COMPARATIVE EXAMPLE 7

The same procedures as in Example 7 were repeated except that the ultraviolet light irradiation was omitted. The initial adhesion strength of the coating was measured and, as a result, the retention was 0%.

While the invention has been described in detail and with reference to specific embodiments thereof, it will be apparent to one skilled in the art that various changes and modifications can be made therein without departing from the spirit and scope thereof.

What is claimed is:

1. A method for surface treating a thermoplastic resin shaped article, which comprises irradiating a surface of the shaped article with an ultraviolet light having a wavelength of 300 nm or less, said shaped article being obtained from a resin composition comprising (I) 100 parts by weight of a resin comprising from 5 to 100% by weight of a polyphenylene ether resin, a mixture of a polyphenylene ether resin and a styrene resin, or a graft copolymer of a polyphenylene ether resin and styrene and from 95 to 0% by weight of at least one thermoplastic resin selected from the group consisting of a polyamide resin and a saturated polyester resin; (II) from 0 to 50 parts by weight of a rubbery substance; (III) from 0 to 50 parts by weight of an inorganic filler and/or glass fibers; and (IV) from 0 to 10 parts by weight of at least one compatibilizer for improving the compatibility between said polyphenylene ether resin and said polyamide resin and/or saturated polyester resin.

2. A method as claimed in claim 1, wherein said compatibilizer (IV) is one or more compounds selected from the group consisting of:

(A) compounds containing, in the molecule thereof, both of (a) a carbon-carbon double bond or a carbon-carbon triple bond and (b) a carboxyl group, an acid anhydride group, an amino group, an acid amide group, an imido group, an epoxy group, a carboxylic acid ester group, an isocyanate group, a methylol group, or a hydroxyl group;

(B) aliphatic polycarboxylic acids or derivatives thereof represented by the following formula:

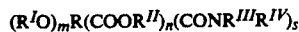

wherein R represents a straight-chain or branched, saturated aliphatic hydrocarbon group having from 2 to 20 carbon atoms; $R^I$ is selected from the group consisting of a hydrogen atom, an alkyl group having from 1 to 10 carbon atoms, an aryl group, an acyl group, and a carbonyldioxy group; $R^{II}$ each independently is selected from the group consisting of a hydrogen atom, an alkyl group having from 1 to 20 carbon atoms, and an aryl group; $R^{III}$ and $R^{IV}$ each independently is selected from the group consisting of a hydrogen atom, an alkyl group having from 1 to 10 carbon atoms, and an aryl group; m is 1; n and s each independently is 0 or more, provided that (n+s) is 2 or more; and the group of $(OR^I)$ is at the α- or β-position with respect to the carbonyl group and at least two carbonyl groups are separated from each other by 2 to 6 carbon atoms, and reaction products of said acids or derivatives;

(C) functional polyphenylene ethers comprising a reaction product of (a) polyphenylene ether with (b) a compound represented by the following formula:

$$\text{(i)-Z-(ii)}$$

wherein (i) represents a group of the formula, [X-C(O)], wherein X is F, Cl, Br, I, OH, —OR, or —O—C(O)—R, and R is H, an alkyl group, or an aryl group; (ii) represents a carboxylic acid group, an acid anhydride group, an acid amide group, an imido group, a carboxylic acid ester group, an amino group, or a hydroxyl group, the groups of (i) and (ii) being covalently bonded with each other the crosslinkage Z, and Z represents a divalent hydrocarbon group;

(D) silane compounds containing, in the molecular structure thereof, both of (a) at least one silicon atom bonded to a carbon atom through crosslinkage of oxygen and (b) an ethylenic carbon-carbon double bond or a carbon-carbon triple bond and/or a functional group selected from an amino group and a mercarpto group, said functional group being not directly bonded to the silicon atom;

(E) oxidized polyolefin waxes;

(F) copolymers containing a vinyl aromatic compound unit and an α,β-unsaturated dicarboxylic acid or dicarboxylic anhydride unit, or copolymers containing a vinyl aromatic compound unit and a unit derived from an imide compound of an α,β-unsaturated dicarboxylic acid; and (G) reaction products obtained by reacting (a) a 1,2-substituted olefin compound having a carboxyl group or an acid anhydride group with (b) polyphenylene ether in the presence or absence of (c) a free-radical initiator.

3. A method as claimed in claim 1, wherein said polyphenylene ether resin in resin (I) is poly(2,6-dimethyl-1,4-phenylene ether).

4. A method as claimed in claim 1, wherein said styrene resin in resin (I) is a styrene homopolymer or a rubber-modified polystyrene.

5. A method as claimed in claim 1, wherein said polyamide resin in resin (I) is polycaprolactam.

6. A method as claimed in claim 1, wherein said polyamide resin in resin (I) is polyhexamethylene adipamide.

7. A method as claimed in claim 1, wherein said polyamide resin in resin (I) is one or more polyamides selected from the group consisting of aliphatic polyamides, thermoplastic aromatic copolyamides, and aromatic nucleus-hydrogenated copolyamides.

8. A method as claimed in claim 1, wherein said rubbery substance (II) is one or more polymers selected from the group consisting of ethylene-propylene rubbers, ethylene-propylene-non-conjugated diene rubbers, styrene-butadiene block copolymers, partially hydrogenated styrene-butadiene block copolymers, styrene-isoprene block copolymers, partially hydrogenated styrene-isoprene block copolymers, styrene-grafted ethylene-propylene rubbers, styrene-acrylonitrile-grafted ethylene-propylene rubbers, styrene-grafted ethylene-propylene-non-conjugated diene rubbers, styrene-acrylonitrile-grafted ethylene-propylene-non-conjugated diene rubbers, and carboxyl or glycidyl group-modified products of these rubbers or copolymers.

9. A method as claimed in claim 1, wherein said inorganic filler (III) has an average particle diameter of 5.0 μm or less and an aspect ratio of 5 or more.

10. A method as claimed in claim 2, wherein said compatibilizer (IV) is at least one member selected from the group consisting of maleic anhydride, maleic acid, fumaric acid, itaconic acid, himic anhydride, glycidyl acrylate, glycidyl methacrylate, and allyl glycidyl ether.

11. A method for coating a thermoplastic resin shaped article, which comprises irradiating a surface of the shaped article with an ultraviolet light having a wavelength of 300 nm or less and then coating the irradiated surface with an alkyd-melamine coating or an acrylic-urethane coating, said shaped article being obtained from a resin composition comprising (I) 100 parts by weight of a resin comprising from 5 to 100% by weight of a polyphenylene ether resin, a mixture of a polyphenylene ether resin and a styrene resin, or a graft copolymer of a polyphenylene ether resin and styrene and from 95 to 0% by weight of at least one thermoplastic resin selected from the group consisting of a polyamide resin and a saturated polyester resin; (II) from 0 to 50 parts by weight of a rubbery substance; (III) from 0 to 50 parts by weight of an inorganic filler and/or glass fibers; and (IV) from 0 to 10 parts by weight of at least one compatibilizer for improving the compatibility between said polyphenylene ether resin and said polyamide resin and/or saturated polyester resin.

12. A method as claimed in claim 11, wherein said compatibilizer (IV) is one or more compounds selected from the group consisting of:
(A) compounds containing, in the molecule thereof, both of (a) a carbon-carbon double bond or a carbon-carbon triple bond and (b) a carboxyl group, an acid anhydride group, an amino group, an acid amide group, an imido group, an epoxy group, a carboxylic acid ester group, an isocyanate group, a methylol group, or a hydroxyl group;
(B) aliphatic polycarboxylic acids or derivatives thereof represented by the following formula:

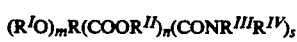

wherein R represents a straight-chain or branched, saturated aliphatic hydrocarbon group having from 2 to 20 carbon atoms; $R^I$ is selected from the group consisting of a hydrogen atom, an alkyl group having from 1 to 10 carbon atoms, an aryl group, an acyl group, and a carbonyldioxy group; $R^{II}$ each independently is selected from the group consisting of a hydrogen atom, an alkyl group having from 1 to 20 carbon atoms, and an aryl group; $R^{III}$ and $R^{IV}$ each independently is selected from the group consisting of a hydrogen atom, an alkyl group having from 1 to 10 carbon atoms, and an aryl group; m is 1; n and s each independently is 0 or more, provided that (n+s) is 2 or more; and the group of $(OR^I)$ is at the α- or β-position with respect to the carbonyl group and at least two carbonyl groups are separated from each other by 2 to 6 carbon atoms, and reaction products of said acids or derivatives;
(C) functional polyphenylene ethers comprising a reaction product of (a) polyphenylene ether with (b) a compound represented by the following formula:

(i)-Z-(ii)

wherein (i) represents a group of the formula, [X-C(O)], wherein X is F, Cl, Br, I, OH, —OR, or —O—C(O)—R, and R is H, an alkyl group, or an aryl group; (ii) represents a carboxylic acid group, an acid anhydride group, an acid amide group, an imido group, a carboxylic acid ester group, an amino group, or a hydroxyl group, the groups of (i) and (ii) being covalently bonded with each other the crosslinkage Z, and Z represents a divalent hydrocarbon group;
(D) silane compounds containing, in the molecular structure thereof, both of (a) at least one silicon atom bonded to a carbon atom through crosslinkage of oxygen and (b) an ethylenic carbon-carbon double bond or a carbon-carbon triple bond and/or a functional group selected from an amino group and a mercapto group, said functional group being not directly bonded to the silicon atom;
(E) oxidized polyolefin waxes;
(F) copolymers containing a vinyl aromatic compound unit and an α,β-unsaturated dicarboxylic acid or dicarboxylic anhydride unit, or copolymers containing a vinyl aromatic compound unit and a unit derived from an imide compound of an α,β-unsaturated dicarboxylic acid; and
(G) reaction products obtained by reacting (a) a 1,2-substituted olefin compound having a carboxyl group or an acid anhydride group with (b) polyphenylene ether in the presence or absence of (c) a free-radical initiator.

13. A method as claimed in claim 11, wherein said polyphenylene ether resin in resin (I) is poly(2,6-dimethyl-1,4-phenylene ether).

14. A method as claimed in claim 11, wherein said styrene resin in resin (I) is a styrene homopolymer or a rubber-modified polystyrene.

15. A method as claimed in claim 11, wherein said polyamide resin in resin (I) is polycaprolactam.

16. A method as claimed in claim 11, wherein said polyamide resin in resin (I) is polyhexamethylene adipamide.

17. A method as claimed in claim 11, wherein said polyamide resin in resin (I) is one or more polyamides selected from the group consisting of aliphatic polyamides, thermoplastic aromatic copolyamides, and aromatic nucleus-hydrogenated copolyamides.

18. A method as claimed in claim 11, wherein said rubbery substance (II) is one or more polymers selected from the group consisting of ethylene-propylene rubbers, ethylene-propylene-non-conjugated diene rubbers, styrene-butadiene block copolymers, partially hydrogenated styrene-butadiene block copolymers, styrene-isoprene block copolymers, partially hydrogenated styrene-isoprene block copolymers, styrene-grafted ethylene-propylene rubbers, styrene-acrylonitrile-grafted ethylene-propylene rubbers, styrene-grafted ethylene-propylen-non-conjugated diene rubbers, styrene-acrylonitrile-grafted ethylene-propylene-non-conjugated diene rubbers, and carboxyl or glycidyl group-modified products of these rubbers or copolymers.

19. A method as claimed in claim 11, wherein said inorganic filler (III) has an average particle diameter of 5.0 μm or less and an aspect ratio of 5 or more.

20. A method as claimed in claim 12, wherein said compatibilizer (IV) is at least one member selected from the group consisting of maleic anhydride, maleic acid, fumaric acid, itaconic acid, himic anhydride, glycidyl acrylate, glycidyl methacrylate, and allyl glycidyl ether.

* * * * *